United States Patent [19]
Hong

[11] Patent Number: 5,857,108
[45] Date of Patent: Jan. 5, 1999

[54] DEVICE AND METHOD FOR GENERATING INTERRUPTS

[75] Inventor: Sang Pyo Hong, Chungcheongbuk-do, Rep. of Korea

[73] Assignee: LG Semicon Co., Ltd., Chungcheongbuk-do, Rep. of Korea

[21] Appl. No.: 649,099

[22] Filed: May 17, 1996

[30] Foreign Application Priority Data

Nov. 21, 1995 [KR] Rep. of Korea .................. 1995 42552

[51] Int. Cl.$^6$ .................. G06F 9/46; G06F 13/14
[52] U.S. Cl. .................. 395/733; 395/734; 395/735; 395/736
[58] Field of Search .................. 395/733, 735, 395/737, 739, 741, 868, 869, 736, 742

[56] References Cited

U.S. PATENT DOCUMENTS

| | | | |
|---|---|---|---|
| 4,961,067 | 10/1990 | Suzuki . | |
| 5,101,497 | 3/1992 | Culley et al. | 395/739 |
| 5,133,056 | 7/1992 | Miyamori | 395/737 |
| 5,179,704 | 1/1993 | Jibbe et al. | 395/740 |
| 5,193,195 | 3/1993 | Miyazaki | 395/735 |
| 5,410,715 | 4/1995 | Ishimoto et al. | 395/775 |
| 5,471,620 | 11/1995 | Shimizu et al. | 395/375 |
| 5,530,903 | 6/1996 | Calvignac et al. | 395/861 |
| 5,555,413 | 9/1996 | Lohman et al. | 395/733 |
| 5,560,019 | 9/1996 | Narad | 395/733 |
| 5,572,151 | 11/1996 | Hanawa et al. | 326/113 |
| 5,581,771 | 12/1996 | Osakabe | 395/738 |
| 5,584,028 | 12/1996 | Shrock | 395/735 |
| 5,615,375 | 3/1997 | Ibusuki et al. | 395/737 |
| 5,617,429 | 4/1997 | Goto | 371/25.1 |
| 5,640,571 | 6/1997 | Hedges et al. | 395/734 |
| 5,659,760 | 8/1997 | Enami | 395/742 |

*Primary Examiner*—Ayaz R. Sheikh
*Assistant Examiner*—Raymond N. Phan

[57] ABSTRACT

A device and method for generating an interrupt for a microcontroller (MCU) are disclosed. The device includes a first storing circuit for storing signals received/transmitted through a plurality of input/output ports; a first comparing circuit for comparing the signals from the first storing circuit with a reference signal and determining a level of the signals based on the comparison result; an encoding circuit for encoding the signals output from the first comparing circuit; a second storing circuit for storing a signal received through a bus; a second comparing circuit for comparing the encoded signals received from the encoding circuit with the signal stored in the second storing circuit, and determining a level of the encoded signals based on the comparison result; an interrupt request generating circuit for generating an interrupt requesting signal based on an output of the second comparing circuit; and an interrupt enabling circuit for determining whether to permit an interrupt in response to the interrupt requesting signal from the interrupt request generating circuit.

17 Claims, 3 Drawing Sheets

DEVICE AND METHOD FOR GENERATING INTERRUPTS

BACKGROUND OF THE INVENTION

The present invention relates to an interrupt generating device and, more particularly, to an interrupt generating device which generates an interrupt signal based on a number of input/output state signals being at a "high" or "low" level in a micro-controller (MCU).

Generally, a microcomputer uses a microprocessor as a central processing unit (CPU) for processing and controlling logic data. A microcomputer includes an input/output device (I/O part) for data input/output and a memory for storing programs and data. Therefore, a one-chip microcomputer or an MCU is a computer in which a microcomputer is integrated on a single chip.

A conventional interrupt generating circuit in the MCU will be explained with reference to the accompany drawings.

FIG. 1 is a block diagram of a conventional interrupt generating circuit.

As shown in FIG. 1, the conventional interrupt generating circuit includes an interrupt edge detecting circuit 1, an edge selecting register circuit 2, an interrupt request signal generating circuit 3, an interrupt enabling circuit 4 and a bus 5.

The interrupt edge detecting circuit 1 detects edges of signals received from peripheral devices through input/output ports (Ports A–N). The edge selecting register circuit 2 selects the detected edge signals in the detecting circuit 1. The interrupt request signal generating circuit 3 receives the selected edge signal from the interrupt edge detecting circuit 1, generates and applies an interrupt request signal to the MCU, and sets interrupt information bits. The interrupt enabling circuit 4 determines whether to use the interrupt information bits set in the interrupt request signal generating circuit 3.

The bus 5 is connected to the edge selecting register circuit 2 and the interrupt enabling circuit 4, for applying signals thereto from the MCU to write data thereon.

Herein, the interrupt request signal generated from the interrupt request signal generating circuit 3 represents a request for an interrupt of the CPU, i.e., the MCU, from a certain peripheral device to the MCU. Upon reception of the interrupt request signal, the MCU determines whether the MCU should proceed with the interrupt according to its own interrupt priority or ignore it. If it is in an interrupt permitting situation, the MCU issues an interrupt response to the peripheral device, according to which the peripheral device applies an interrupt signal to the MCU to activate interrupt of the MCU.

The operation of the aforementioned conventional interrupt generating circuit will be explained.

As shown in FIG. 1, according to data which is written in the edge selecting register circuit 2 through the bus 5, the interrupt edge detecting circuit 1 discriminates whether a signal applied to input ports A–N is in transit from logic "high" to logic "low" or vice versa. Here, the edge selecting register circuit 2 selects one of the ports A–N so that only the signal input to the selected port is discriminated by the detecting circuit 1.

Then, the edge signal detected in the interrupt edge detecting circuit 1 is applied to the interrupt request signal generating circuit 3. The edge signal sets the interrupt request signal generating circuit 3, which generates and applies an interrupt request signal to the MCU.

In response, among the enable bits corresponding to the input/output ports A–N, the MCU only sets the bits which it intends to use as interrupt information bits and applies them to the interrupt enabling circuit 4 through the bus 5. In this time, if the interrupt request signal generating circuit 3 is set and interrupt information bits are set, the interrupt is generated according to a preset priority.

However, among many of the request signals applied to the input/output ports, the aforementioned conventional interrupt generating device only detects one port signal according to the selection of ports and thereby generates only one interrupt.

Moreover, malfunctioning of the MCU can occur due to the high driving current when many input/output ports become high level.

SUMMARY OF THE INVENTION

Therefore, the present invention is designed to solve the aforementioned various problems of the conventional techniques.

An object of the present invention is to provide an interrupt generating device and a method, in which an interrupt is generated when a predetermined number of input/output ports of an MCU are at logic "high" or "low" level, for preventing malfunction of the MCU from over-current.

To accomplish the objects of the present invention, there is provided an interrupt generating device, including first storing means for storing signals received/transmitted through a plurality of input/output ports; first comparing means for receiving signals stored in the first storing means, comparing the received signals to a reference voltage, and determining a level of the received signals; encoding means for encoding signals ($O_1$–$O_N$) from the first comparing means according to the number of signals being at a high or low level; second storing means for storing a signal received through an MCU bus; second comparing means for comparing the encoded signal ($X_1$–$X_i$) received from the encoding means with the signal stored in the second comparing means and determining a level of the encoded signal; interrupt request generating means for generating an interrupt requesting signal based on the level of the encoded signal received from the second comparing means; and interrupt enabling means for enabling an interrupt in response to the interrupt requesting signal from the interrupt request generating means and a condition of the MCU.

To accomplish the objects of the present invention, there is provided a method for generating an interrupt, including a step of storing signals applied through a plurality of input/output ports and signals transmitted through an MCU bus; a step of comparing the signals stored at the storing step to a reference voltage and determining logic "high" or logic "low" of the signals; a step of encoding the logic "high" or "low" level of the signals ($O_1$–$O_N$) compared and determined in the previous step, comparing the encoded signal to a signal stored through the MCU bus, and generating a logic "high" signal based on the comparison result; a step of setting interrupt generation information bits and generating an interrupt requesting signal in response to the logic "high" signal generated in the previous step, applying the interrupt requesting signal to the MCU, and determining an interrupt enable situation of the MCU; and a step of, when it is determined to be an interrupt enable situation, providing an interrupt response for determining use of an interrupt, whereby an interrupt is generated according to the set interrupt generation bits.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will be explained below with reference to the accompanying drawings.

Figure 1:
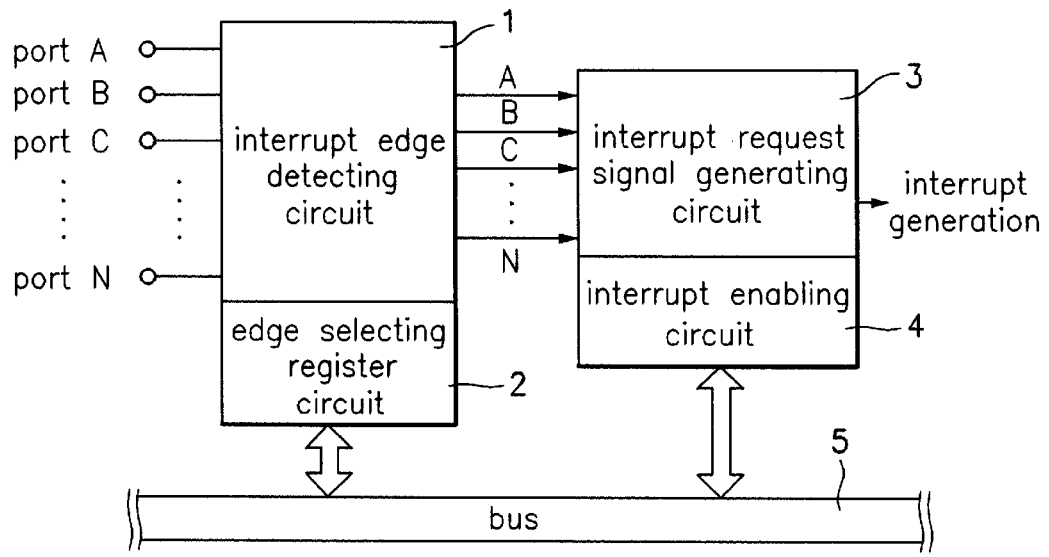
FIG. 1 is a block diagram of a conventional interrupt generating circuit.
Figure 2:
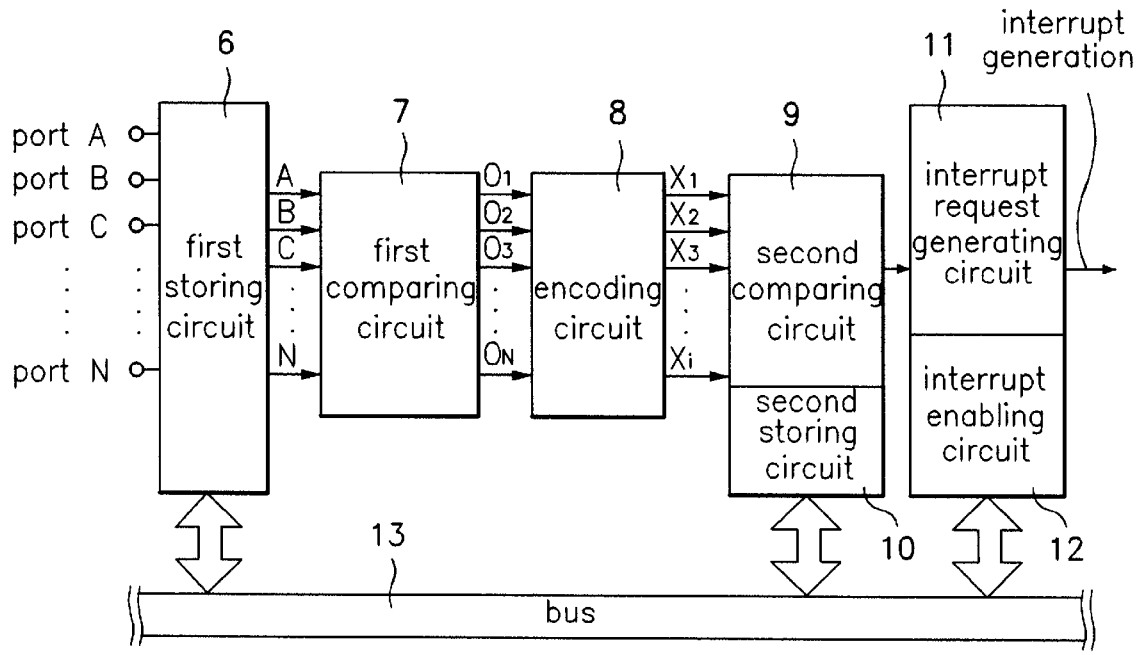
FIG. 2 is a block diagram of an interrupt generating circuit in accordance with the embodiments of the present invention.
Figure 3:
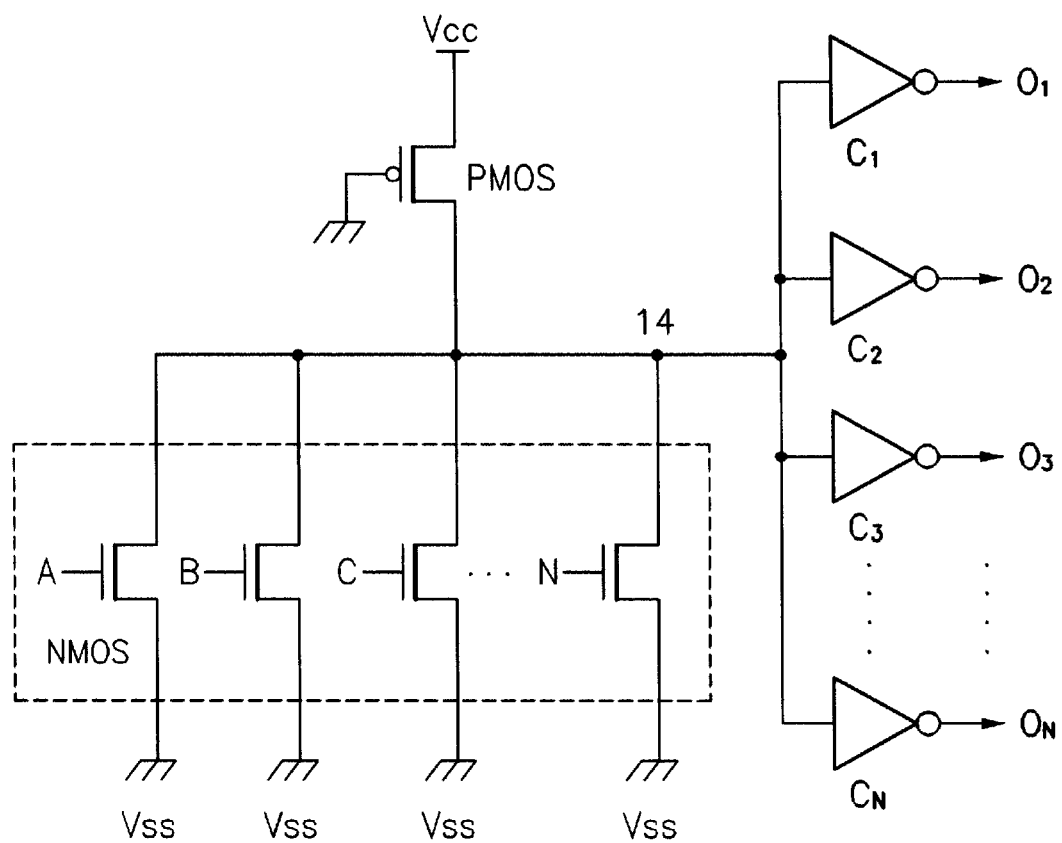
FIG. 3 is a detailed circuit diagram of the first comparing circuit in FIG. 2.
Figure 4:
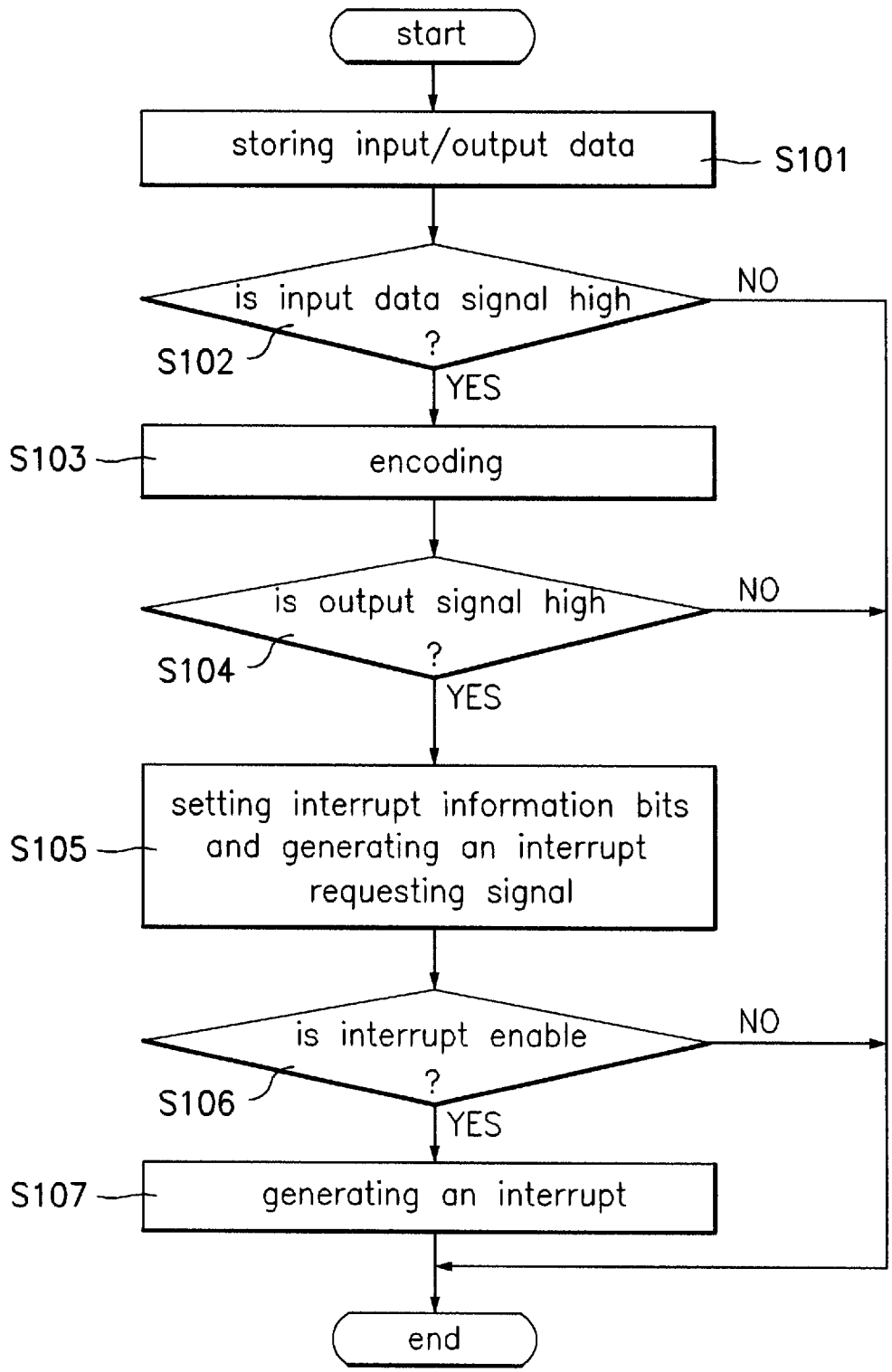
FIG. 4 is a flowchart for explaining an operation of generating an interrupt in accordance with the embodiments of the present invention.

FIG. 2 is a block diagram of an interrupt generating circuit of the present invention, FIG. 3 is a detailed circuit diagram of the first comparing circuit in FIG. 2, and FIG. 4 is a flowchart for explaining an operation of generating an interrupt in accordance with the present invention.

As shown in FIG. 2, the interrupt generating device of the present invention includes a first storing circuit 6, a first comparing circuit 7, an encoding circuit 8, a second comparing circuit 9, a second storing circuit 10, an interrupt request generating circuit 11, and an interrupt enabling circuit 12.

Here, the first storing circuit 6 stores the input/output states of data which are input/output through a plurality of input/output ports A–N. The first comparing circuit 7 compares the signals A–N received from the first storing circuit 6 with a reference signal and determines whether the signals are in a high-state or a low-state. Based on the determination, the first comparing circuit 7 outputs signals $O_1$–$O_N$ to the encoding circuit 8. The encoding circuit 8 encodes the signals $O_1$–$O_N$ according to the number of signals $O_1$–$O_N$ being in a high or low state, and outputs encoded signals $X_1$–$X_i$ to the second comparing circuit 9.

The second storing circuit 10 stores data transmitted from the MCU through a bus 13, and the second comparing circuit 9 compares the data stored in the second storing circuit 10 with the encoded signals $X_1$–$X_i$ from the encoding circuit 8. The result of the comparison is applied to the interrupt request generating circuit 11.

At this time, according to the comparison result, the interrupt request generating circuit 11 generates an interrupt requesting signal to the MCU through the MCU bus 13. In response, the MCU determines whether to permit the interrupt and controls the interrupt enabling circuit 12 to enable interrupt, if the interrupt is permitted.

As shown in FIG. 3, the first comparing circuit 7 includes a PMOS transistor having a power voltage Vcc applied to a drain terminal and a grounded gate terminal, a plurality of NMOS transistors connected to one another in parallel, and a plurality of inverters $C_1$–$C_N$ connected to the PMOS and NMOS transistors. Each of the NMOS transistors has a gate terminal for receiving one of the signals A–N and a drain terminal connected to a source terminal of the PMOS transistor. The plurality of inverters $C_1$–$C_N$ are connected to each other in parallel and each of them has an input terminal connected to the drain terminals of the NMOS transistors.

The operation of the interrupt generating device having the aforementioned system and a method for generating an interrupt in accordance with the embodiments of the present invention will be explained in detail with reference to FIGS. 2–4.

As shown in FIG. 2, the first storing circuit 6 includes a portion for determining input/output of input/output ports A–N, and a portion for storing the data input or output through the ports A–N.

In this time, the first storing circuit 6 stores signals input or output through the plurality of the ports A–N (S101 in FIG. 4). These signals A–N are applied to the first comparing circuit 7.

The first comparing circuit 7 receives the data from the first storing circuit 6, and compares them with a reference signal to detect any high states of the signals (S102).

As shown in FIG. 3, the NMOS transistors receives the signals A–N applied from the first storing circuit 6, with the gate of the PMOS transistor being grounded. Here, each of the NMOS transistors in the first comparing circuit 7 has the same size to provide a compact device.

If it is assumed that the plurality of the NMOS transistors have an N number of signals applied thereto, N-levels of voltages will appear at node 14 in FIG. 3 depending on the N value of the signal.

That is, by varying turn-on resistances of the NMOS transistors, the NMOS transistors produce voltages different from one another. These voltages are applied to the inverters $C_1$–$C_N$, each inverter having a logic threshold voltage different from one another.

The inverters $C_1$–$C_N$ have N number of different logic threshold voltages. Therefore, at the node 14, the N-number of voltages different from one another are present from the N number of NMOS transistors, which results in signals $O^1$–$O_N$ being output by the inverters $C_1$–$C_N$.

The encoding circuit 8 receives and encodes the signals $O^1$–$O_N$ from the inverters $C_1$–$C_N$ according to a number of high level signals detected, and outputs encoded signals $X_1$–$X_i$ (S103).

The encoded signals $X_1$–$X_i$ from the encoding circuit 8 are applied to the second comparing circuit 9. The second comparing circuit 9 compares the encoded signals received from the encoding circuit 8 with the data in the second storing circuit 10 received through the bus 13, and applies the comparison values to the interrupt request generating circuit 11 (S104).

Upon the receipt of the comparison values from the second comparing circuit 9, the interrupt request generating circuit 11 generates an interrupt requesting signal (S105) and applies it to the through the MCU bus 13. In response, the MCU determines whether to permit the interrupt according to its interrupt priority or ignore the interrupt request (S106).

If it is determined that a permission for use of the interrupt should be granted, that is, if it is in an interrupt enable condition, the MCU applies to the interrupt request generating circuit 11 an interrupt response by the interrupt enabling circuit 12 outputting an enabling signal.

Accordingly, the interrupt request generating circuit 11 generates an interrupt (S107) and activates the actual interrupt process.

The request for the interrupt generated by the generating circuit 11 is either given a permission or ignored depending on a set or reset signal from the bus 13, i.e., depending on an enable state. The interrupt response time period of the MCU is a time period from the time of the interrupt generation to the starting time of an interrupt subroutine. It is known that a shorter response period is desirable.

As has been explained, the interrupt generating device and method of the present invention generates an interrupt depending on the number of high level voltages received at the input/output ports, and thus prevents the MCU from malfunctioning due to an excessive current flow arising from the activation of many input/output ports.

Although the invention has been described in conjunction with specific embodiments, it is evident that many alternatives and variations will be apparent to those skilled in the art in light of the foregoing description. Accordingly, the invention is intended to embrace all of the alternatives and variations that will fall within the spirit and scope of the appended claims.

What is claimed is:

1. An interrupt generating device comprising:

first storing means for storing signals received through a plurality of input/output ports;

first comparing means for comparing the signals from the first storing means with a reference signal, determining a level of the signals from the input/output ports based on a comparison result, and generating output signals based on a determination result;

encoding means for encoding the output signals generated from the first comparing means;

second storing means for storing a signal received through a bus;

second comparing means for comparing the encoded signals received from the encoding means with the signal stored in the second storing means, and determining a level of the encoded signals based on a comparison result;

interrupt request generating means for generating an interrupt requesting signal based on an output of the second comparing means; and interrupt enabling means for determining whether to permit an interrupt in response to the interrupt requesting signal from the interrupt request generating means, so as to control activation of the input/output ports, wherein the first comparing means includes, a first type transistor having a drain terminal to which a predetermined voltage is applied and a gate terminal which is grounded, plurality of second type transistors connected to each other, each of the second type transistors having a gate terminal receiving one of the signals from the first storing means and a drain terminal connected to a source terminal of the first type transistor, and a plurality of inverters connected to the drain terminal of the plurality of second type transistors.

2. A device as claimed in claim 1, wherein each of the plurality of second type transistors has a substantial same size.

3. A device as claimed in claim 1, wherein each of the plurality of inverters has a logic threshold voltage different from one another.

4. A device as claimed in claim 1, wherein each of an input node of the plurality of inverters has a voltage level different from one another.

5. A device as claimed in claim 1, wherein the first type transistor is a PMOS transistor and the second type transistors are NMOS transistors.

6. A device as claimed in claim 1, wherein the encoded signals output from the encoding means represent a number of input/output ports receiving a high level signal.

7. A device as claimed in claim 1, wherein the encoded signals represent a number of transitions present in the signals received through the input/output ports.

8. A device for generating an interrupt comprising:

detection means for detecting a transition in each of signals input through a corresponding one of input/output ports and outputting detection signals based on detection results;

encoding means for encoding the detection signals from the detection means and outputting encoded signals which represent a number of transitions detected in the detection means;

comparing means for comparing the encoded signals with a predetermined signal and outputting a signal based on a comparison result; and interrupt generation means for generating an interrupt request signal based on the comparison result and generating an interrupt in accordance with a response to the interrupt request signal, so as to control activation of the input/output ports, wherein the interrupt generation means includes an interrupt request generating circuit for generating the interrupt request signal, and an interrupt enabling circuit for determining whether to permit the interrupt in response to the interrupt request signal and generating an enabling signal based on the determination.

9. A device as claimed in claim 8, wherein the detection means includes a first type transistor, a plurality of second type transistors connected to the first type transistor and receiving signals stored in the detection means, and a plurality of inverters connected to the second type transistors for outputting the detection signals.

10. A device as claimed in claim 9, wherein the first type transistor has a drain terminal to which a predetermined voltage is applied and a grounded gate terminal, the plurality of second type transistors being connected to each other, each of the second type transistors having a gate terminal receiving one of the signals stored in the detection means and a drain terminal connected to a source terminal of the first type transistor, the plurality of inverters being connected to the drain terminal of the plurality of second type transistors.

11. A device as claimed in claim 8, wherein the detection means includes a storage circuit for storing the signals input to the input/output ports and data received through a microcontroller unit (MCU) bus.

12. A device as claimed in claim 9, wherein the first type transistor is a PMOS transistor and the second type transistors are NMOS transistors.

13. A device as claimed in claim 9, wherein each of the plurality of inverters has a logic threshold voltage different from one another.

14. A method of generating an interrupt comprising the steps of:

detecting a transition in each of signals input through input/output ports and outputting detection signals based on detection results;

encoding the detection signals and outputting encoded signals which represent a number of transitions detected in said detecting step;

comparing the encoded signals with a predetermined signal and outputting a signal based on a comparison result; and generating an interrupt request signal based on the comparison result, and an interrupt in accordance with a response to the interrupt request signal, so as to control activation of the input/output ports, wherein said generating step includes the steps of,
   providing an interrupt request generating circuit for generating the interrupt request signal, and
   providing an interrupt enabling circuit connected to the interrupt request generating circuit, for determining whether to permit the interrupt in response to the interrupt request signal and generating an enabling signal based on the determination.

15. A method of claim 14, wherein said detecting step includes the steps of:

providing a first type transistor;

providing a plurality of second type transistors connected to each other and to the first type transistor, each of the second type transistors having a gate terminal receiving one of the signals input to the input/output ports; and connecting a plurality of inverters to the plurality of second type transistors.

16. A method of claim 15, wherein the first type transistor is a PMOS transistor and the second type transistors are NMOS transistors.

17. A method of claim 15, wherein each of the plurality of inverters has a logic threshold voltage different from one another.

* * * * *